US011374433B2

(12) United States Patent
Meyer

(10) Patent No.: US 11,374,433 B2
(45) Date of Patent: Jun. 28, 2022

(54) METHOD FOR OPERATING A CIRCUIT FOR GENERATING AN ELECTROMAGNETIC FIELD, AND CIRCUIT

(71) Applicant: MOLEX CVS DABENDORF GMBH, Dabendorf (DE)

(72) Inventor: Joerg Meyer, Berlin (DE)

(73) Assignee: Molex CVS Dabendorf GmbH, Zossen (DE)

(*) Notice: Subject to any disclaimer, the term of this patent is extended or adjusted under 35 U.S.C. 154(b) by 0 days.

(21) Appl. No.: 17/253,634

(22) PCT Filed: Jul. 1, 2019

(86) PCT No.: PCT/EP2019/067642
§ 371 (c)(1),
(2) Date: Dec. 18, 2020

(87) PCT Pub. No.: WO2020/007812
PCT Pub. Date: Jan. 9, 2020

(65) Prior Publication Data
US 2021/0175750 A1 Jun. 10, 2021

(30) Foreign Application Priority Data
Jul. 4, 2018 (DE) .......................... 102018211033.6

(51) Int. Cl.
*H02J 50/12* (2016.01)
(52) U.S. Cl.
CPC .................................. *H02J 50/12* (2016.02)

(58) Field of Classification Search
CPC ........................................................ H02J 50/12
USPC ........................................................ 307/104
See application file for complete search history.

(56) References Cited

U.S. PATENT DOCUMENTS

| 4,047,120 A | 9/1977 | Lord et al. | |
|---|---|---|---|
| 2011/0187318 A1* | 8/2011 | Hui | H02J 7/00 320/108 |
| 2015/0280443 A1* | 10/2015 | Vladan | H03F 3/2171 307/104 |
| 2016/0254700 A1 | 9/2016 | Akuzawa et al. | |
| 2016/0294445 A1 | 10/2016 | Norconk et al. | |
| 2018/0102669 A1 | 4/2018 | Son et al. | |
| 2018/0109246 A1 | 4/2018 | Zaplana | |
| 2018/0154786 A1 | 6/2018 | Wang et al. | |

FOREIGN PATENT DOCUMENTS

WO 2020/007812 A1 1/2020

OTHER PUBLICATIONS

International search report and written opinion received for PCT application No. PCT/EP2019/067642, dated Sep. 20, 2019, 15 pages. (6 pages of English translation and 9 pages of Official copy).

* cited by examiner

*Primary Examiner* — Joseph Chang

(57) ABSTRACT

The invention relates to a method for operating a circuit for generating an electromagnetic field for inductive energy transmission, wherein an inverter for providing an AC voltage is operated at a first clock frequency, wherein operation at an additional clock frequency is superimposed on the operation at the first clock frequency; and a circuit.

7 Claims, 4 Drawing Sheets

METHOD FOR OPERATING A CIRCUIT FOR GENERATING AN ELECTROMAGNETIC FIELD, AND CIRCUIT

RELATED CASES

This application claims priority to PCT Application No. PCT/EP2019/067642, filed Jul. 1, 2019, which is incorporated herein by reference in its entirety and which claims priority to German Application No. 102018211033.6, filed Jul. 4, 2018.

FIELD OF INVENTION

The invention relates to a method for operating a circuit for generating an electromagnetic field for inductive energy transmission, and to a corresponding circuit.

BACKGROUND

It is known to transmit energy inductively, in particular also to portable end devices such as mobile telephones or what are known as tablet PCs. Via such an inductive energy transmission, the corresponding end device no longer needs to be connected to an energy source via cables.

The generation of an electromagnetic field for inductive energy transmission normally takes place by means of at least one coil structure (primary coil structure) which is charged with an AC voltage and then generates the electromagnetic field. The electromagnetic field generated in this way is received by means of a further coil structure (secondary coil structure) which may be part of the end device, for example, and induces a voltage which may then be used, for example, for operating the end device or for charging a battery/accumulator.

It is desirable to adjust the power transmitted by means of the inductive energy transmission, for example in order to adapt the transmission to operating conditions of the end device, for example a maximum charging voltage of an end device.

Essentially, two methods are known for adjusting the power. On the one hand, an adjustment may take place in that the electrical voltage for charging the primary coil structure is provided with an adjustable and thus variable frequency. A second possibility is to adjust an input DC voltage of an inverter to generate this AC voltage. This normally takes place with suitable DC-DC converters, for example buck converters or buck-boost converters.

The technical problem arises of simplifying a circuit for generating an electromagnetic field for inductive energy transmission, in particular of reducing installation space requirements and corresponding costs, wherein at the same time a reliable and precise adjustment of the transmitted power is enabled.

SUMMARY

A method is proposed for operating a circuit for generating an electromagnetic field for inductive energy transmission. The inductive energy transmission is in particular an energy transmission to a mobile end device, for example a mobile telephone or a tablet PC, which may also be referred to as a receiver.

The circuit may be installed in a vehicle. In particular, the circuit may hereby be connected in terms of signal and/or data to a vehicle communication system and/or to an onboard electrical system of the vehicle. However, this is not mandatory. Of course, the circuit may also be used in other fields of application which require the generation of an electromagnetic field for inductive energy transmission.

The circuit for generating the electromagnetic field comprises at least one inverter. Furthermore, as explained in more detail below, the circuit may comprise or have at least one control device for controlling the operation of the inverter, at least one filter device for filtering an output voltage of the inverter, and at least one coil structure for generating the electromagnetic field upon being charged with the output voltage. The output voltage of the inverter is hereby an AC voltage. An input voltage of the inverter is a DC voltage.

The inverter designates a component or a totality of components with which an AC voltage with desired properties, in particular a desired (base) frequency and/or a desired amplitude, may be generated from an input DC voltage. The inverter can hereby be designed as a bridge circuit, in particular as what is known as a half bridge or what is known as a full bridge. In particular, the inverter may comprise switching elements, for example switching elements designed as what are known as MOSFETs or IGBTs. These switching elements may be set to a conductive state or a blocking state by a clock signal (gate signal). The clock signal may hereby be provided or generated by at least one control device. The clock signal thus provided may then be transmitted via what is known as a gate driver to a gate terminal of the switching element. The gate driver may hereby amplify the clock signal. The gate driver may likewise be part of the circuit.

Furthermore, during a period duration of the corresponding clock signal, a switching element may first be set to a conductive state and thereafter into a blocking state, or vice versa. In particular, a switching element may be set to the conductive state if a level of the base clock signal has a predetermined first level value. This first level value may also be referred to as high level. Accordingly, the switching element may be set to a blocking state if a level of the base clock signal has a second predetermined value. This second level value may also be referred to as low level. The high level may hereby be higher than the low level. A duty cycle of the clock signal may hereby denote in particular a ratio of the duration in a period in which the clock signal has the high level relative to the total period duration.

The clock signal may hereby have what is known as a clock frequency. A desired frequency of the output voltage of the inverter may be adjusted depending on the clock frequency. In particular, the clock frequency may be equal to the desired frequency.

In the method, the inverter is operated at a first clock frequency to provide the AC voltage. This may mean in particular that at least one, but preferably all, switching element(s) of the inverter are switched at this first clock frequency. The first clock frequency may hereby also be referred to as a base frequency. The first clock frequency may be 111 kHz, for example.

The operation at the first clock frequency may also take place in particular in that a base clock signal having the first clock frequency is generated, wherein the base clock signal or a clock signal generated depending on the base clock signal is then used to control the switching processes of the switching elements of the inverter.

The base clock signal may be a square wave signal, for example A duty cycle of the base clock signal may correspond to a predetermined value, preferably 0.5.

According to the invention, operation at an additional clock frequency is superimposed on the operation of the inverter, in particular of the switching elements of the inverter, at the first clock frequency. In particular, this may mean that at least one, preferably all, switching element(s) of the inverter are operated at least intermittently at an additional clock frequency during operation at the first clock frequency. Operation of the inverter with two different frequencies may thus take place permanently or at least intermittently.

The operation at the additional clock frequency may in particular take place in that a modulation signal at the additional clock frequency is generated, and then the clock signal for controlling the switching processes of the switching elements of the inverter is generated depending on the base clock signal and also depending on the modulation signal. The modulation signal may be a square wave signal, for example. Alternatively, however, it is also possible that the modulation signal has a form different from the rectangular shape.

Both the base clock signal and the modulation signal may thus form signals for generating the (resulting) clock signal for controlling the switching elements of the inverter.

For example, it is possible for the base clock signal to be varied, thus modulated, by the modulation signal. For example, the base clock signal may form a carrier signal, and the modulation signal may form a signal for its modulation. The modulation may, for example, take place via a simple superposition, for example in the form of a signal addition. The modulation preferably takes place via an AND-linking of the two signals.

However, other alternatives for generating the clock signal are also possible. For example, the base clock signal may thus form the clock signal in a first time interval and the modulation signal in an additional time interval.

The transmitted power may then be adjusted by adjusting at least one property of the additional modulation signal, in particular a duty cycle of the modulation signal. In particular, the variation in the at least one property may thus lead to a variation in the transmitted power, in particular given otherwise constant boundary conditions.

In particular, the base clock signal may serve to adjust the base frequency of the output voltage of the inverter, and thus to adjust the frequency of the electromagnetic field for inductive energy transmission, wherein the modulation signal serves to adjust the power to be transmitted.

An adjustment of the power transmitted by inductive energy transmission, said adjustment being reliable and realizable in a simple manner in terms of circuitry, hereby advantageously results.

In particular, it is not necessary to vary an amplitude of the input voltage of the inverter, in particular with a corresponding DC-DC converter. Installation space of the circuit and production costs may hereby be reduced. Furthermore, it is not necessary to vary the first clock frequency of the inverter which serves to adjust the frequency of the output voltage of said inverter, whereby a simple control of the inverter is enabled.

In a further detailed embodiment, the additional clock frequency is higher than the first clock frequency. In other words, the frequency of the modulation signal is higher than the frequency of the base clock signal. A simply realizable variation of the base clock signal for adjusting a desired power to be transmitted hereby advantageously results.

The clock frequency of the modulation signal is preferably 5 times to 15 times higher than the clock frequency of the base clock signal, preferably 10 times higher.

In a further detailed embodiment, a clock signal is generated depending on a base clock signal having the first clock frequency and a modulation signal having the additional clock frequency. This and corresponding advantages have already been explained above.

In particular, a switching element-specific clock signal may be generated for each switching element of the inverter depending on the base clock signal and the modulation signal. Different clock signals may thus be generated.

In a further detailed embodiment, a switching element of the inverter is switched at the additional clock frequency during a duration in which the base clock signal has a first level during a period of the base clock signal. The first level may preferably be the high level. Alternatively, however, the first level may also be the low level.

It is possible that the switching element is switched at the additional clock frequency even during a duration in which the base clock signal has a second level, thus for example the low or the high level, during a period of the base clock signal. However, this is not mandatory. In particular, it is also possible that the switching element of the inverter is not switched at the additional clock frequency during the duration in which the base clock signal has the second level.

A simply realizable variation of the resulting clock signal for operation of the inverter hereby advantageously results which serves to adjust the power to be transmitted.

In a further embodiment, the first switching element is set to a conductive state by the first level. A simple modulation capability of the base clock signal for adjusting the power to be transmitted hereby advantageously results.

It is possible that the first signal and the modulation signal have the same amplitude. However, it is also possible that the amplitudes of the base clock signal and of the modulation signal are different from one another. A simply realizable adjustment of the power to be transmitted also hereby advantageously results.

In a preferred embodiment, a duty cycle of the modulation signal is varied. The duty cycle may in particular be varied to adjust the power to be transmitted. In other words, the duty cycle may be adjusted depending on a power to be transmitted. The duty cycle may hereby be adjusted between 0 (inclusive, exclusive) and 1 (inclusive, exclusive). A simply realizable adjustment of the power to be transmitted hereby advantageously results.

It is possible that the duty cycle is constant during at least one period of the base clock signal. Alternatively, however, the duty cycle may also change during a period of the base clock signal.

In a further embodiment, a duty cycle of the modulation signal is adjusted depending on the desired power. This and corresponding advantages have already been explained above.

In a further embodiment, an output voltage of the inverter is filtered, wherein at least one coil structure for generating the electromagnetic field is charged with the filtered output voltage. Unwanted interference components of the output voltage generated by the inverter may hereby be advantageously reduced or completely eliminated.

As is explained in more detail below, a filter circuit may serve for filtering. This filter circuit may have at least one grounding section which is connected to a reference potential. The filter circuit is preferably symmetrically designed relative to the grounding section.

Additionally, a circuit for generating an electromagnetic field for inductive energy transmission is proposed. The circuit hereby serves to implement a method for operating a circuit for generating an electromagnetic field for inductive energy transmission, according to an embodiment described in this disclosure. The circuit is thus in particular designed in such a way that such a method may be executed with the circuit.

As explained above, the circuit comprises an inverter and at least one control device. The control device may be designed as a microcontroller or comprise such a microcontroller.

According to the invention, the inverter can be operated by means of the at least one control device at a first clock frequency in order to provide an AC voltage, wherein operation at an additional clock frequency can be superimposed on the operation at the first clock frequency.

In particular, it may be possible to generate at least one clock signal for operating at least one switching element of the inverter by means of the at least one control device or an additional control device, depending on a base clock signal having the first clock frequency and a modulation signal having the additional clock frequency.

The base clock signal may hereby be generated by a base clock signal generating device. The base clock signal generating device may be the control device. Furthermore, the modulation signal may be generated by a modulation signal generating device. The modulation signal generating device may be different from the base clock signal generating device.

Furthermore, it may be possible to generate at least one clock signal for operating at least one switching element of the inverter depending on the base clock signal and the modulation signal. For this purpose, the circuit may have a device for providing the clock signal, for example a modulation device. The device for providing the clock signal may be the control device. Alternatively, however, the device for providing the clock signal may also be a logic circuit, in particular an analog logic circuit, in particular a CPLD. Furthermore, however, the device for providing the clock signal may also alternatively be an integrated circuit, in particular an FPGA.

This and corresponding advantages have already been explained above.

It is furthermore possible that the clock signal is transmitted to a gate driver, wherein the gate driver amplifies the clock signal and transmits it to at least one switching element of the inverter.

This advantageously results in a circuit for generating an electromagnetic field for inductive energy transmission which enables a reliable and precise adjustment of a power to be transmitted, wherein, however, the number of required components and thus also installation space requirements and costs are reduced.

The circuit may furthermore comprise a filter circuit for filtering the AC voltage output signal. Furthermore, the circuit may comprise a primary coil structure for generating the electromagnetic field for inductive energy transmission. This primary coil structure may be electrically connected to AC voltage output terminals of the inverter, in particular via the explained filter circuit.

The circuit may furthermore at least one gate driver, wherein the gate driver generates a switching signal for a switching element depending on the clock signal. In particular, the gate driver may amplify the clock signal.

In a further embodiment, the circuit comprises a filter circuit, wherein the filter circuit has at least one grounding section which is connected to a reference potential.

The reference potential is preferably a chassis ground (ground potential). An optimally interference-free superposition of an additional clock frequency hereby advantageously results. Furthermore, it advantageously results that the sum of the interference currents, caused by the square wave switching voltage of the bridges with their harmonics, may be derived with respect to the reference potential.

In a preferred embodiment, the filter circuit is formed symmetrically relative to the grounding section. This may mean that a first sub-arrangement of electrical components of the filter circuit between a first AC voltage output terminal of the inverter and the grounding section corresponds to a second sub-arrangement of additional electrical components of the filter circuit between a second AC voltage output terminal of the inverter and the grounding section.

In other words, the two explained sub-arrangements are similarly designed, in particular with regard to dimensioning the electrical components and their electrical arrangement/interconnection. Thus, if the first AC voltage output terminal of the inverter is connected to the grounding section via the first sub-arrangement of electrical components of the filter circuit, the second AC voltage output terminal of the inverter may be electrically connected to the grounding section via the second sub-arrangement, wherein the second arrangement is designed identical to the first arrangement.

It hereby advantageously results that electrical components of the filter circuit may be dimensioned smaller in terms of maximum permissible voltages/currents occurring during operation, whereby installation space and costs in the production of the proposed circuit may be reduced in turn.

In another embodiment, an electrical connection between a DC voltage supply unit for providing the input voltage of the inverter and a DC voltage terminal of the inverter has no DC-DC converter. In other words, the input voltage of the inverter cannot be adjusted/varied via a DC-DC converter.

However, it is of course possible that the input voltage of the inverter fluctuates. Such fluctuations are permissible and may in particular be leveled. It is also possible that voltage fluctuations are used in a targeted manner to influence the power, for example via a targeted adjustment of the input voltage.

The circuit may also comprise a DC voltage supply device, for example a corresponding energy storage device or a connection interface for connection to an external DC voltage network.

In other words, the circuit comprises no DC-DC converter for adjusting/varying the input voltage of the inverter.

BRIEF DESCRIPTION OF THE DRAWINGS

The invention is explained in more detail with reference to exemplary embodiments. Individual Figures show.

The same reference signs hereinafter denote elements having the same or similar technical features.

DETAILED DESCRIPTION

Figure 1:
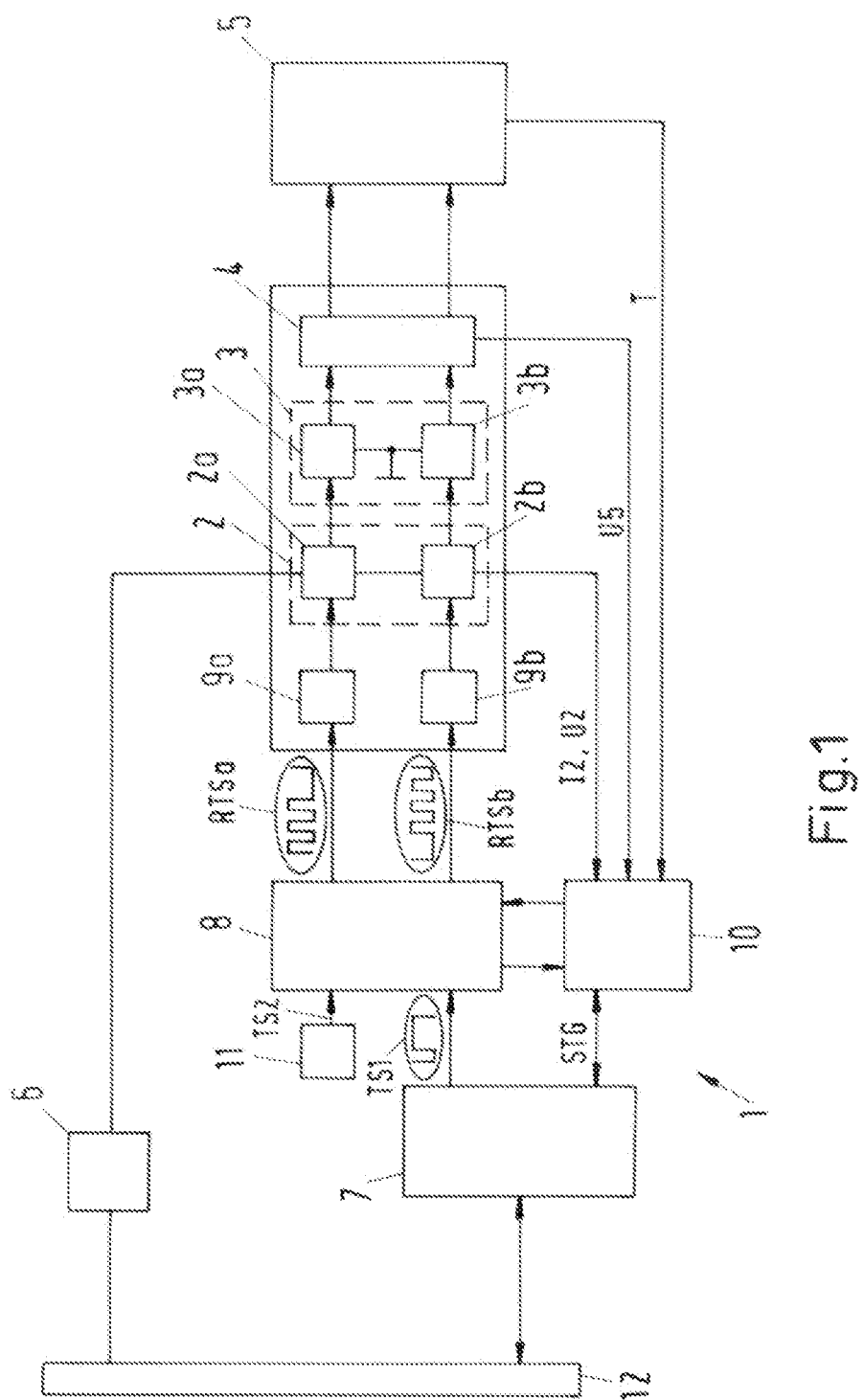
FIG. 1 a schematic block diagram of a circuit according to the invention.

Schematically depicted in FIG. 1 is a block diagram of a circuit 1 according to the invention for generating an electromagnetic field for inductive energy transmission to an end device (not shown), in particular a portable end device. The circuit 1 comprises an inverter 2, wherein the inverter 2 comprises a first sub-circuit 2a designed as a half bridge and a further sub-circuit 2b likewise designed as a half bridge.

The circuit 1 furthermore comprises a filter circuit 3 which likewise comprises a filter sub-circuit 3a and a further filter sub-circuit 3b.

The circuit 1 according to the invention may furthermore comprise a compensation circuit 4. A resonance frequency of a circuit arrangement comprising the filter circuit, the compensation circuit, and a primary coil structure 5 may be adjusted to a desired resonance frequency by the compensation circuit. Furthermore, the circuit 1 may also comprise the at least one primary coil structure 5. However, it is of course possible for the circuit 1 to comprise more than one primary coil structure 5, thus a plurality of primary coil structures 5.

A DC voltage supply device 6 is also depicted. This may also be part of the circuit 1. An input (DC) voltage for the inverter 2 is provided by means of the DC voltage supply device 6, which may likewise be designed as a circuit, for example. The input voltage may have an amplitude of 14 V, for example.

It is furthermore illustrated that both the DC voltage supply device 6 and the first control device 7 may be connected via an interface 12 to a vehicle communication system and/or to an onboard electrical system of the vehicle.

The inverter 2 then converts this DC voltage into an output (AC) voltage. This output voltage is then transmitted to the primary coil structure 5 via the filter circuit 3 and the compensation circuit 4. The primary coil structure 5 is thus charged with a filtered AC voltage and, upon being charged, generates an electromagnetic field for inductive energy transmission.

The circuit 1 furthermore comprises a control device 7 designed as a microcontroller, for example.

The control device 7 generates a base clock signal TS1. This base clock signal is generated with a first frequency, which may also be referred to as base frequency. The base frequency may be 111 kHz, for example.

The base clock signal TS1 is transmitted to a modulation device 8. The modulation device 8 may in particular be designed as a logic circuit, in particular as an analog circuit. The modulation device 8 is preferably designed as a CPLD (Complex Programmable Logic Device).

A signal generating device 11, which may also be part of the circuit 1, generates a modulation signal TS2. This modulation signal TS2 is generated in phase with the base clock signal TS1. Furthermore, the modulation signal TS2 is generated with an additional frequency, which may also be referred to as a modulation frequency. Furthermore, the modulation signal TS2 may be generated with a predetermined duty cycle, for example 0.5. The modulation frequency may be a multiple, in particular an integer multiple, of the base frequency.

The clock frequency of the base clock signal TS1 may thus be less than the clock frequency of the modulation signal TS2. In particular, the clock frequency of the modulation signal may be in a range from 0 (exclusive) to 100 (inclusive) times, preferably 10 times, greater than the clock frequency of the base clock signal TS1.

The modulation device 8 may transmit the modulation signal TS2 to a signal processing device 10. The duty cycle of the modulation signal TS2 may be varied by means of the signal processing device 10. In particular, the control device 7 may specify a nominal duty cycle, for example in the form of a control (DC) voltage, wherein the duty cycle of the modulation signal TS2 is adjusted to this nominal duty cycle by means of the signal processing device 10. The duty cycle of the modulation signal may hereby be varied between 0 (inclusive) and 1 (inclusive). In particular, the duty cycle may be adjusted depending on a desired power to be transmitted. The duty cycle may be encoded via a level of the control voltage, for example.

The signal processing device 10 may hereby likewise be a logic circuit, in particular an analog logic circuit. This serves in particular for signal conditioning or shaping.

The modulation signal TS2 with the duty cycle adjusted by the signal processing device 10 may then be transmitted to the modulation device 8 again.

This may generate resulting clock signals RTSa, RTSb for controlling the switching elements (not shown) of the half bridges 2a, 2b in that the base clock signal TS1 is varied, thus modulated, with an adjusted duty cycle depending on or via the modulation signal TS2. The modulation may in particular be a pulse width modulation. In particular, a logical AND-linking between the base clock signal TS1 and the modulation signal TS2 may take place with a set duty cycle.

The base clock signal TS1 may hereby be a square wave signal. The modulation signal TS2 may likewise be a square wave signal.

In particular, however, the variation may take place only when the base clock signal TS1 has a first level, in particular a high level, during a period. If the base clock signal TS1 has a second level, in particular a low level, during a period, no variation via the modulation signal TS2 may take place. In this instance, the clock signal may correspond to the base clock signal TS1. The first clock signal TS1 may thus be varied in particular such that a switching element of the inverter 2 is switched back and forth, between a conductive state and a blocking state, at the additional clock frequency during a duration in which the first clock signal TS1 has a first level.

The resulting clock signals RTSa, RTSb so generated are then transmitted to gate drivers 9a, 9b, which amplify the corresponding resulting clock signals RTSa, RTSb and transmit them as switching signals to switching elements of the half bridges 2a. The resulting clock signals RTSa, RTSb may hereby be different from one another.

In FIG. 1 it is shown that the variation in the duty cycle of the modulation signal takes place via the signal processing device 10. It is of course also possible that this variation takes place via corresponding functional elements of the modulation device 8. It is hereby possible that the duty cycle of the modulation signal is constant within a period duration of the base clock signal TS1.

It is furthermore shown that characteristics of the circuit 1, for example a voltage U5 of the primary coil structure 5, a temperature T of the primary coil structure 5, a bridge voltage U2, and a bridge current I2, which may be detected by means of suitable detection devices or sensors, for example, may be transmitted to the control device 7 via the signal processing device 10. The signal processing device 10 hereby serves for signal conditioning of the corresponding characteristics, in particular in order to enable a simple analog-digital conversion by the control device 7.

Another characteristic may be, for example, an input DC voltage of the inverter 2 which is provided by the voltage supply device 6. This may vary due to the variation of external framing conditions, for example drop upon starting an engine if the circuit is installed in a vehicle and is connected to a vehicle onboard electrical system.

In particular a current operating point of the circuit, in particular a currently transmitted power, may be determined by the control device 7 depending on at least one characteristic. Depending on the operating point determined in this way, the power to be transmitted may then be varied by the control device 7, in particular by varying the nominal duty cycle STG, for example in that the previously explained control voltage is varied accordingly. For example, if a deviation from a desired power to be transmitted arises, a duty cycle of the additional control signal or of the additional clock signal may then be adjusted so that the desired power to be transmitted is again transmitted by the circuit 1.

It is furthermore possible that a receiving device having a secondary coil structure which receives the electromagnetic field generated by the primary coil structure 5 generates a variation of properties of the voltage U5 of the primary coil structure 5 via a corresponding variation of properties, for example a variation of the coupling coefficient.

For example, electrical properties of the secondary coil structure may be changed according to a specific sequence, in particular a desired bit sequence, e.g. corresponding to a bit sequence of a desired data stream (sequence of high level and low level bits).

This may on the one hand take place via a variation or switching of a resistive load which is connected to output terminals of the secondary coil structure. Alternatively or cumulatively, this may take place by varying or switching the capacitance of a capacitive element of the secondary resonant circuit comprising the secondary coil structure and the capacitive element.

In the latter instance, a detuning of the system resonant circuit, which is formed from the primary resonant circuit (comprising the primary coil structure 5) and the secondary resonant circuit, takes place by varying or switching the capacitance.

If the primary and secondary resonant circuits are not coupled, for example if the receiver comprising the secondary coil structure is not in the vicinity of the primary coil structure 5 or rests on a primary-side bearing surface, then primary and secondary resonant circuits have their own predetermined resonance frequencies. If the receiver approaches the primary coil structure, for example upon placement of the receiver, both resonant circuits couple inductively, whereby the respective resonance frequencies adapt and the resonant circuits form a common oscillation system.

If electrical properties of the secondary resonant circuit are then varied, this always also has repercussions on properties of the primary resonant circuit, wherein in particular an amplitude of the voltage at the primary coil structure 5 varies depending on the variation in the electrical properties of the secondary resonant circuit.

This variation of the voltage at the primary coil structure 5 may be detected, wherein the data stream may then be decoded depending on the variations detected in this way.

Information about such changes may thus be transmitted from the receiving device to the control device 7. The control device 7 may thus decode this information, which is encoded in the voltage U5 of the primary coil structure 5 processed by the signal processing device 10. In this way, it is possible that a receiving device (not shown) transmits a desired nominal power to the control device 7.

Figure 2:
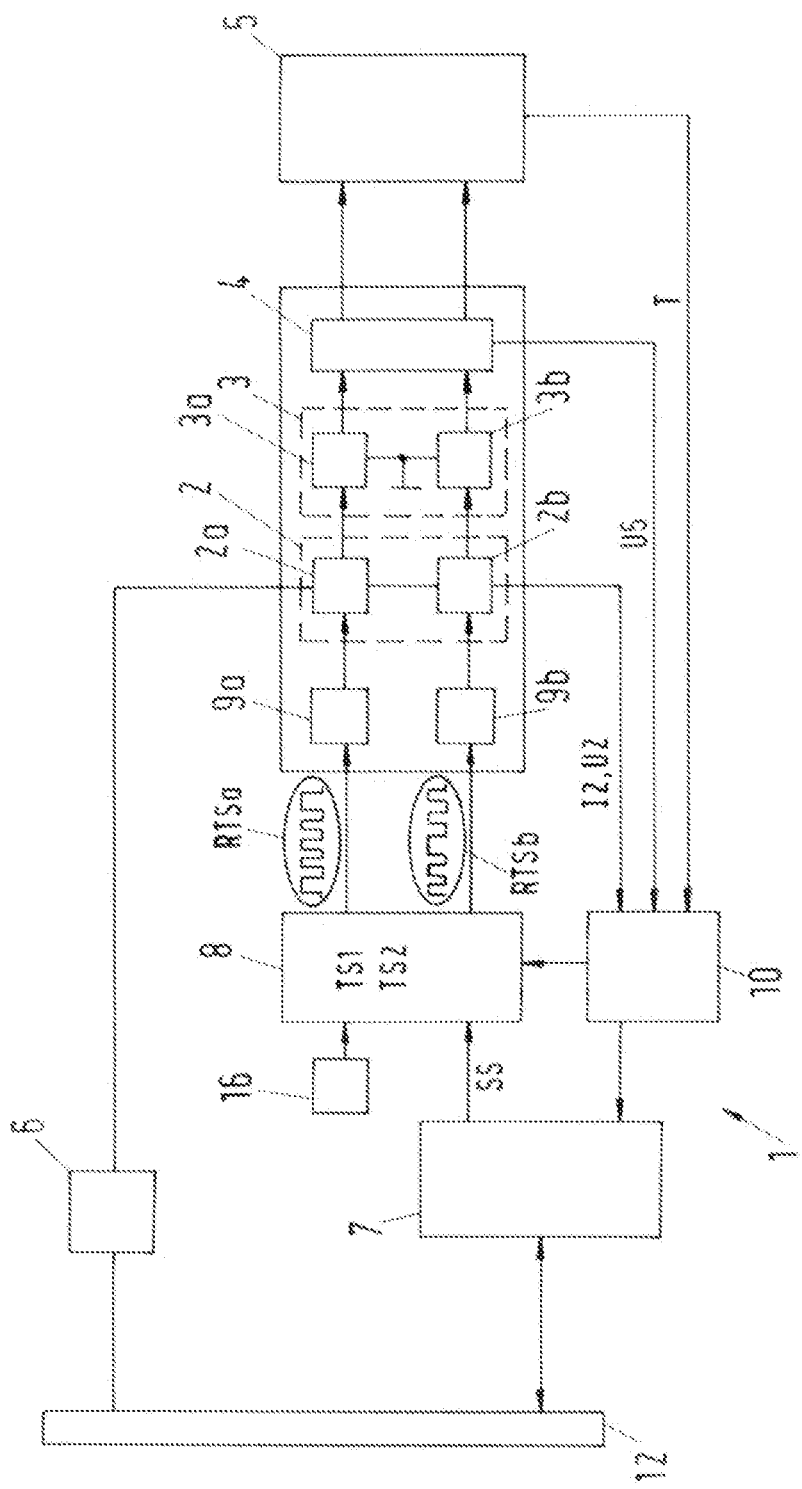
FIG. 2 a schematic block diagram of a circuit according to the invention in a further embodiment, FIG. 3 a schematic block diagram of a filter circuit, and FIG. 4 a schematic flowchart of a method according to the invention.

FIG. 2 shows a circuit 1 according to the invention in a further embodiment. The circuit 1 shown in FIG. 2 is essentially designed like the circuit 1 shown in FIG. 1, whereby reference can be made to the corresponding statements relating to FIG. 1. In contrast to the circuit 1 shown in FIG. 1, the first control device 7 does not generate a base clock signal TS1 but rather a nominal signal SS which encodes nominal properties of a base clock signal TS1 and of a modulation signal TS2. Nominal properties may be, for example, a frequency of the base clock signal TS1, a frequency of the modulation signal TS2, and a desired duty cycle of the modulation signal.

Depending on the nominal signal SS, the modulation device 8 then generates the resulting clock signals RTSa, RTSb already described in FIG. 1 for controlling the switching elements of the inverter 2.

The modulation device 8 is hereby designed in particular as an integrated circuit, preferably as an FPGA. The modulation device 8 may hereby be connected to an oscillating device 16 and generate the base clock signal TS1 and the modulation signal TS2 depending on an output signal of this oscillation device 16, and vary the base clock signal TS1 via the modulation signal TS2, as explained above, to generate the resulting clock signals RTSa, RTSb.

In contrast to the embodiment shown in FIG. 1, it is furthermore possible that a duty cycle of the modulation signal TS2 is varied, in particular continuously, within a period of the base clock signal TS1. For example, the variation of the duty cycle of the modulation signal TS2 may be sinusoidal. However, other time curves of the duty cycle may of course also be realized in a period of the base clock signal TS1, for example a triangular curve.

In this instance, the variation of the base clock signal TS1 via the modulation signal TS2 takes place both in a time period of a period of the base clock signal TS1 in which the base clock signal TS1 has a first level, and in the state as well as in a time period of a period of the base clock signal TS1 in which the base clock signal TS1 has a second level.

Such a variation of the duty cycle of the modulation signal TS2 has the technical advantage that an electromagnetic compatibility of the circuit 1 is improved. A better efficiency of the inductive energy transmission is furthermore advantageously achieved. This is so in particular since, due to the explained variations of the duty cycle, the AC voltage generated by the inverter 2 has smaller interference components, and thus requirements for filtering the output signal of the inverter 2 may be reduced.

Figure 3:
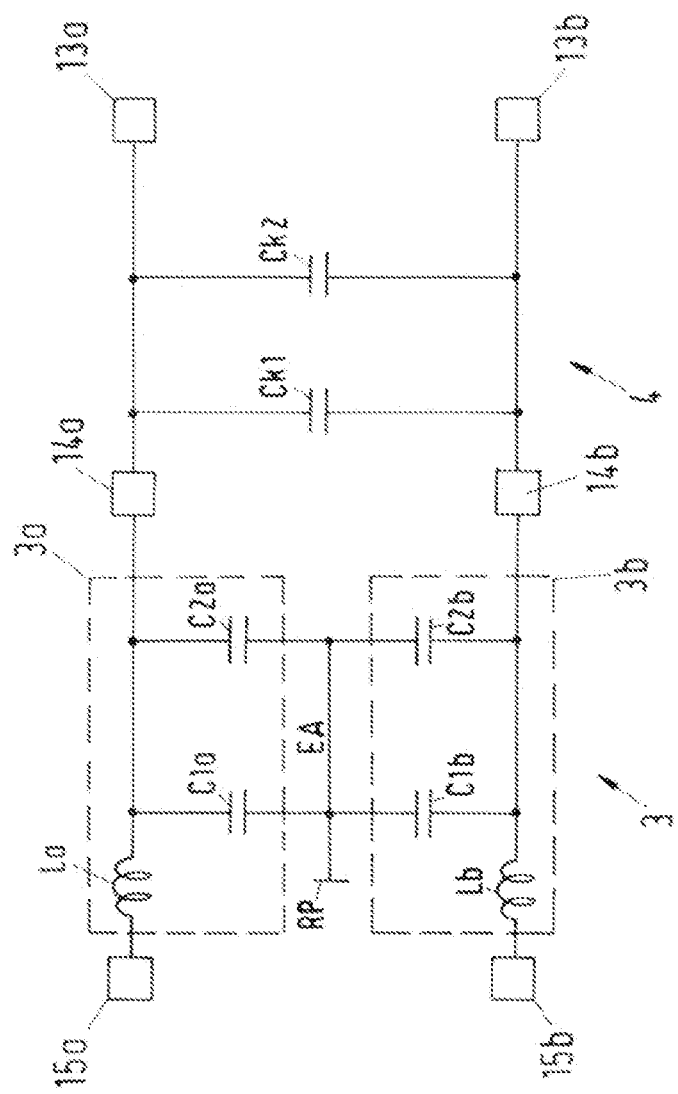

FIG. 3 shows a schematic block diagram of a filter circuit 3 according to the invention and of a compensation circuit 4. The filter circuit 3 comprises two sub-arrangements, namely a first filter sub-arrangement 3*a* and a second filter sub-arrangement 3*b*.

A first inverter-side terminal 15*a* and an additional inverter-side terminal 15*b* of the filter circuit 3 are shown. A first coil structure-side terminal 14*a* and an additional coil structure-side terminal 15*b* of the filter circuit 3 are furthermore shown. The compensation circuit 4 is connected to these terminals 14*a*, 14*b*. Furthermore shown is a first coil structure-side terminal 13*a* and a second coil structure-side terminal 13*b* of the compensation circuit 4, to which the primary coil structure 5 (see FIG. 1) is connected.

The filter circuit 3 has a grounding section EA which is electrically connected to a reference potential RP. The reference potential RP may in particular be a ground potential. Furthermore, it is shown that the filter circuit 3 is designed symmetrically relative to the grounding section EA. In particular, an electrical connection between the first inverter-side terminal 15*a* and the grounding section EA, thus the first filter sub-arrangement 3*a*, is formed in the same way as the electrical connection of the second inverter-side terminal 15*b* to the grounding section EA, thus as the second filter sub-arrangement 3*b*. The filter sub-arrangements 3*a*, 3*b* respectively comprise an inductive element La, Lb designed as a coil, for example. Furthermore, the filter sub-arrangements 3*a*, 3*b* respectively comprise a parallel circuit of a first capacitive element C1*a*, C1*b*, designed for example as a capacitor, and a second capacitive element C2a, C2b, likewise designed as a capacitor.

The cited parallel circuit of the capacitive elements C1a, C2a, C1b, C2b is connected in series with the corresponding inductive element La, Lb of the corresponding filter sub-arrangement 3a, 3b. The series circuit made up of the first inductive element La and the parallel circuit of the capacitive elements C1a, C2a of the first filter sub-arrangement 3a is thus arranged between the first inverter-side connection 15 a. Arranged between the second inverter-side terminal 15b and the grounding section EA is the series circuit of the second inductive element Lb and the parallel circuit of the capacitive elements C1b, C2b of the second filter sub-arrangement 3b. An inductance of the inductive elements La, Lb of the filter sub-arrangements 3a, 3b may be identical. Capacitances of the first capacitive elements C1a, C1b of the two filter sub-arrangements 3a, 3b may likewise be identical. Accordingly, the capacitances of the second capacitive elements C2a, C2b of the two filter sub-arrangements 3a, 3b may be identical.

The compensation circuit 4 comprises two compensation capacitors Ck1, Ck2 connected in parallel.

Figure 4:
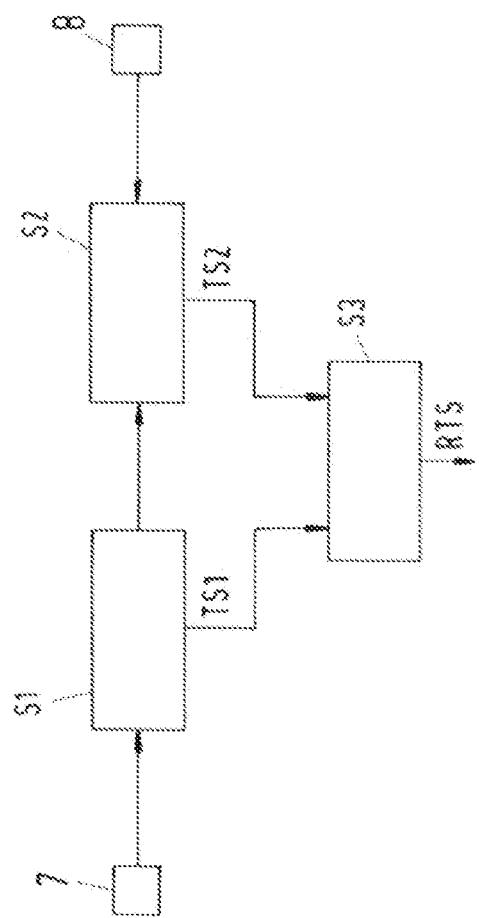

FIG. 4 shows a schematic flowchart of a method according to the invention. In a first step S1, a base clock signal TS1 having a first frequency is generated. In a second step S2, a modulation signal TS2 having an additional clock frequency is generated, wherein the additional clock frequency is higher than the first clock frequency. The modulation signal TS2 is hereby generated depending on the base clock signal TS1, in particular such that it is synchronized to the base clock signal TS1. In particular, a phase position of the base clock signal TS1 may be determined, wherein a phase position of the modulation signal TS2 is then adjusted such that the two signals TS1, TS2 have a predetermined phase difference. In particular, the phase position of the modulation signal TS2 may be adjusted such that the beginning of a period of the base clock signal TS1 corresponds to the beginning of a period of the modulation signal TS2.

The first clock frequency may hereby be adjusted by the first control device 7. A duty cycle of the modulation signal TS2 may be adjusted by means of a signal processing device 10 (see FIG. 1) or a modulation device 8 (see for example FIG. 2). In a third step S3, the base clock signal TS1 may then be varied, in particular modulated, via the modulation signal TS2. A pulse width modulation may take place in particular. Furthermore, in the third step S3 a resulting clock signal RTS for operating the inverter 2 may be generated.

The first and second steps S1, S2 may hereby be executed simultaneously at least temporarily, in particular after the synchronization.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

The invention claimed is:

1. A method for operating a circuit for generating an electromagnetic field for inductive energy transmission, comprising:
    operating an inverter for providing an AC voltage at a first clock frequency; and
    superimposing a second clock frequency on the inverter, wherein the inverter has a switching element and at least one clock signal for operation of the switching element is generated depending on a base clock signal having the first clock frequency and a modulation signal having the second clock frequency, wherein the switching element is switched at the second clock frequency during a duration in which the base clock signal has a first level.

2. The method of claim 1, wherein the second clock frequency is higher than the first clock frequency.

3. The method of claim 1, wherein the switching element is set to a conductive state via the first level.

4. The method of claim 3, wherein a duty cycle of the modulation signal is varied.

5. The method of claim 3, wherein a duty cycle of the modulation signal is adjusted depending on a desired power.

6. The method of claim 1, wherein an output voltage of the inverter is filtered, wherein a coil structure is charged with the filtered output voltage to generate the electromagnetic field.

7. A circuit for generating an electromagnetic field for inductive energy transmission, comprising
    an inverter;
    a control device, wherein the control device is configured to operate the inverter at a first clock frequency in order to provide an AC voltage, wherein an additional clock frequency is superimposed on the operation at the first clock frequency; and
    a filter circuit, wherein the filter circuit has at least one grounding section which is connected to a reference potential and the filter circuit is designed symmetrically relative to the grounding section, wherein an electrical connection between a DC voltage supply device and a DC voltage terminal of the inverter has no DC-DC converter.

* * * * *